United States Patent [19]

Wefel

[11] 4,321,493
[45] Mar. 23, 1982

[54] CURRENT TRANSFORMER SUPPORT ASSEMBLY

[75] Inventor: Jerry D. Wefel, Rockford, Ill.

[73] Assignee: Sundstrand Corporation, Rockford, Ill.

[21] Appl. No.: 137,080

[22] Filed: Apr. 2, 1980

[51] Int. Cl.³ .................... H02K 11/00; H01F 15/02
[52] U.S. Cl. .................................... 310/68 D; 336/65
[58] Field of Search ................ 336/174, 84 C, 65, 67, 336/68, 92, 174, 175, 173, 84 R, 84 M; 310/68 R, 72, 68 D

[56] References Cited

U.S. PATENT DOCUMENTS

| | | | |
|---|---|---|---|
| 2,829,338 | 4/1958 | Lord | 336/174 X |
| 3,380,009 | 4/1968 | Miller | 336/174 X |
| 3,526,712 | 9/1970 | Drom | 336/65 X |
| 3,988,707 | 10/1976 | Moser et al. | 336/65 |
| 4,013,985 | 3/1977 | Graham et al. | 336/175 X |

FOREIGN PATENT DOCUMENTS 968862  6/1975  Canada ................................ 336/174

*Primary Examiner*—Thomas J. Kozma

*Attorney, Agent, or Firm*—Ted E. Killingsworth; Michael B. McMurry; Harold A. Williamson

[57] ABSTRACT

This invention relates to a current transformer support assembly for use in an electromotive machine that includes an armature slideably secured to the electromotive machine housing. The armature end windings have radially disposed neutral armature conductors. The support assembly includes an arcuate shaped support member secured internally of the housing within a recessed region of the housing. The arcuate shaped support member is provided with at least one well shaped opening in which a secondary current transformer winding is positioned. A neutral armature assembly is provided that includes an arcuate strap secured in a mating manner to the support member. The neutral armature assembly has a neutral lead which acts as a primary for the current transformer. The neutral lead is secured to the strap and passes through a central opening in the current transformer winding for electrical connection to a neutral armature winding. The current transformers so mounted are completely supported by the housing.

10 Claims, 9 Drawing Figures

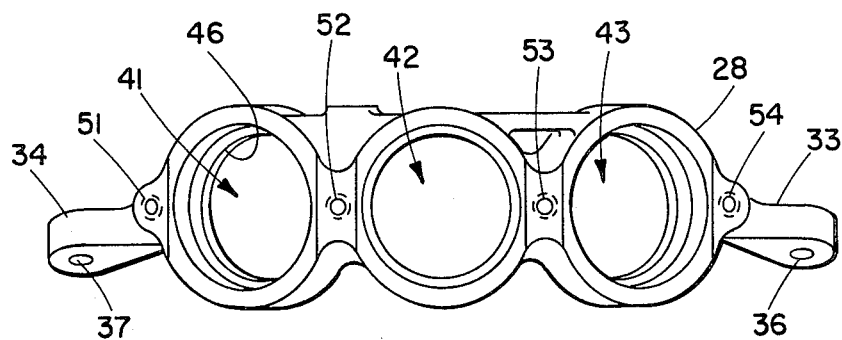
FIG. 3
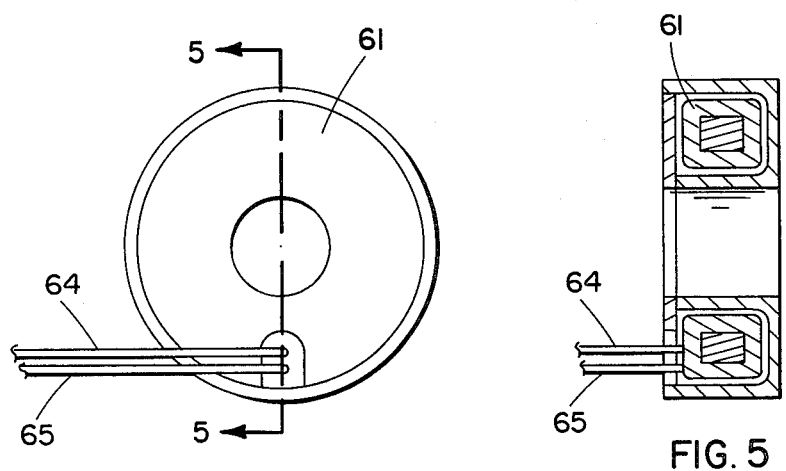
FIG. 4
FIG. 5
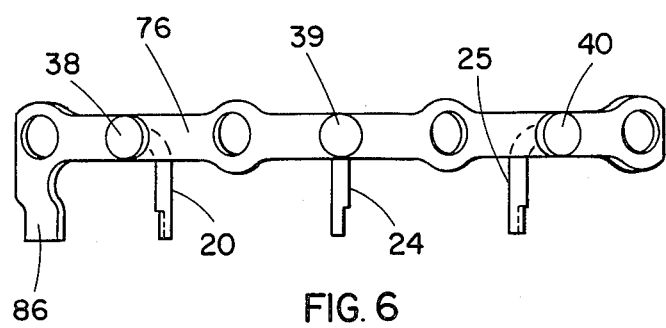
FIG. 6

CURRENT TRANSFORMER SUPPORT ASSEMBLY

TECHNICAL FIELD

This invention relates to a support assembly for current transformers used in an electromotive machine.

BACKGROUND ART

In the electromotive arts, there has been a growing need in respect of electric generators for the detection of short circuits of faults that arise during operation when the generators are connected to an electrical distribution system. These electrical distribution systems can be very complex, and when these complex systems are incorporated in an aircraft, the need for rapid fault detection is heightened lest a short circuit not be promptly detected and an electrical fire aboard the aircraft follow.

A fault detection system of the more advance type is shown in copending patent application Ser. No. 06/124,666 owned by the assignee of this invention. The just noted fault detection system is provided with current transformers integral with the aircraft's generators and inductively coupled to the neutral armature windings of the generator. Faults that arise between the generators, circuit breakers, loads and a distribution bus are detected by the detection of a differential fault current detection circuit. This detection circuit provides, in part, for the sensing of the nature of the current present at the neutral armature conductors of each generator. To accomplish this current sensing at the generator, current sensing transformers have been secured to the end windings of the generator's stator armature end windings. The common practice of securing a current sensing transformer to the end windings of an armature most generally have taken the form of nonconductive strips of material laced through the armature end windings and wrapped around the current transformer to hold the same in place. Frequently, epoxy cements are added to further ensure that the current transformers would not vibrate loose and break off in vibrationally hostile environment of the aircraft mounted generator. The prior art technique of lashing a current transformer to an armature end windings have always increased the possibility of there arising an open circuit condition in the detection circuit as a consequence of the current transformer vibrating free from the armature end windings. The invention to be described hereinafter virtually avoids the possibility of such an open circuit condition arising.

DISCLOSURE OF INVENTION

The present invention relates to a current transformer support assembly for use in an electromotive machine that includes an armature secured by an interference fit and radial screws to the electromotive machine housing. The armature end windings have radially disposed neutral armature conductors. The support assembly includes an arcuate shaped support member secured internally of the housing within a recessed region of the housing. The arcuate shaped support member is provided with at least one well shaped opening in which a secondary current transformer winding is positioned. A neutral armature assembly is provided that includes an arcuate strap secured in a mating manner to the support member. The neutral armature assembly has a neutral lead which acts as a primary for the current transformer. The neutral lead is secured to the strap and passes through a central opening in the current transformer winding for electrical connection to a neutral armature winding. The current transformers so mounted are completely supported by the housing.

It is therefore a primary object of this invention to provide a current transformer support assembly for use in conjunction with the armature windings of a generator, which current transformer support assembly is firmly secured to the generator's housing.

Another object of this invention is to provide a current transformer assembly that includes a plurality of well shaped openings on a support member secured to a housing, such that the current transformers are protected from the direct vibrational influences found present in generator armature end windings.

Yet another object of this invention is to provide, within well shaped chambers formed in a current transformer support member, electromagnetic shielding elements that enhance the detection capabilities of transformer windings located in the wells.

In the attainment of the foregoing objects, this invention contemplates that the current transformer support assembly embodying the invention finds its utility in a generator housing that has an armature interference fit into the generator housing. The armature end windings have radially extending neutral armature conductors. The current transformer support assembly includes an arcuate shaped support member secured internally of the generator housing in a recessed region of the housing. Integrally formed in the arcuate support member are a plurality of well shaped chambers in which are disposed secondary current transformer windings. A neutral armature unit is fitted over the wells and has a strap that spans all of the well shaped chambers. The strap is secured to the support on opposite sides of each well and is electrically insulated from the support member. Neutral leads are secured to the strap and pass through central openings in the secondary transformer windings for electrical connection to neutral armature conductors. The strap is provided with an electrical connection tab that allows for an external electrical connection of the strap through the neutral lead to the neutral armature conductor. Each of the well shaped chambers is fitted with an electromagnetic shield disposed between the winding and the armature. Each of the current transformer windings is provided with a pair of electrical leads connected in parallel.

Other objects and advantages of the present invention will be apparent upon reference to the accompanying description when taken in conjunction with the following drawings:

BRIEF DESCRIPTION OF DRAWINGS

FIG. 3 is a perspective view of a current transformer support member, FIG. 4 is a top view of a current transformer employed in carrying out an invention, FIG. 5 is a sectional view taken along line 5—5 in FIG. 4, FIG. 6 is a top view of a neutral armature assembly.

Figure 1:
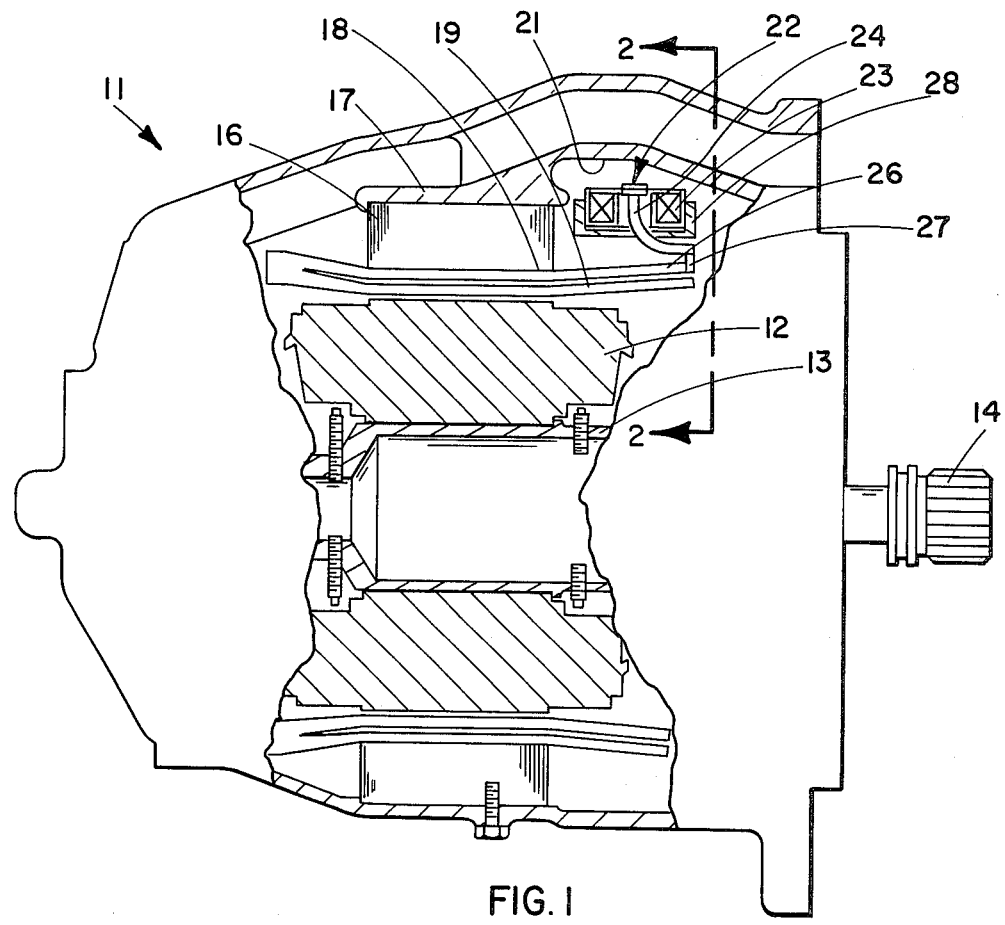
FIG. 1 is a partial section of a generator in which the invention finds utility.

Reference is now made to FIG. 1 which illustrates a section of generator 11 that includes a rotor 12 mounted on a shaft 13. The shaft 13 is driven by an input shaft 14 connected thereto by means not shown. A stator 16 is shown press-fitted into the generator housing 17. The stator 16 has integral therewith, armature windings 18 and 19 shown schematically herein. It is to be understood that the details of the generator 11 are conventional. The generator housing 17 includes a recessed portion 21 in which there is positioned and secured by means not shown, a current transformer support assembly 22 that embodies the invention. The cross sectional illustration of the current transformer support assembly 22 reveals a number of the basic components of the current transformer support assembly. Centrally disposed and passing through a secondary transformer winding 23 is a neutral lead 24 secured at its lower end 26 to a neutral armature conductor 27. A current transformer support member 28 surrounds the secondary winding 23. Further details of the current transformer support assembly can be more clearly seen in FIG. 2 and the various components that comprise the current transformer support assembly 22 are set forth in expanded graphic detail in FIGS. 3-7.

Figure 2:
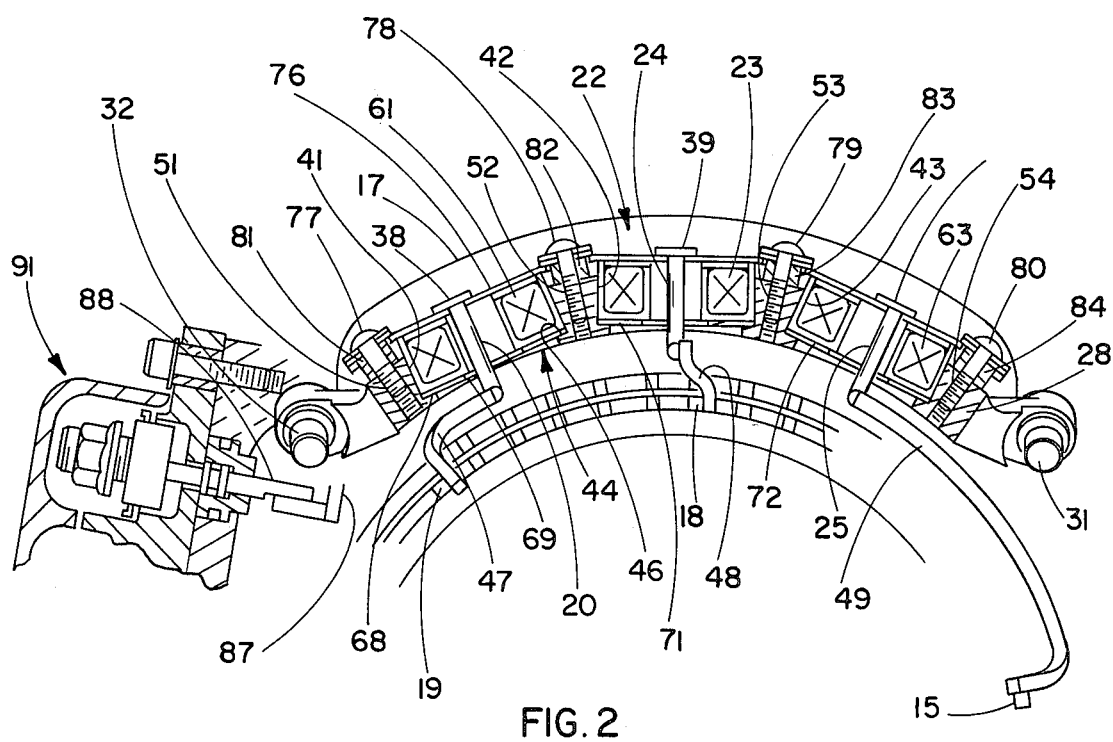
FIG. 2 is a section taken along line 2—2 in FIG. 1.

Reference is now made to FIG. 2 in which there is shown in section, the current transformer support assembly 22. The explanation of the details of construction of the current transformer support assembly 22 will be enhanced by reference to the details of construction of the various components illustrated in FIGS. 3-7. Accordingly, the current transformer support member 28 here shown having an arcuate configuration is secured at either end by bolts 31, 32 to the schematically illustrated generator housing 17. Attention is now directed to FIG. 3 which sets forth a perspective view of the current transformer support member 28. The view in FIG. 3 represents a top view of the current transformer support member 28 as it would be viewed in position in FIGS. 1 and 2. The current transformer support member 28 is provided with mounting flanges 33 and 34. Each of the flanges 33 and 34 are provided with bored openings 36 and 37 through which bolts 31 and 32 shown in FIG. 2 pass. The current transformer support member 28 is shown provided with three well-shaped chambers 41, 42 and 43. Each of the well-shaped chambers 41, 42 and 43 are identical and the details of construction of but one of these chambers will be explained. Accordingly, it will be seen, for example in FIG. 2, that chamber 41 is provided at the bottom with a central opening 44 and a peripherally disposed lip 46. The centrally disposed opening 44 can also be readily discerned in FIG. 3 as can the peripherally disposed lip 46. On opposite sides of well-shaped chambers 41, 42 and 43 are threaded openings 51, 52, 53 and 54.

Reference is now made back to FIG. 2 where the cross-sectional details of the current transformer support member 28 may be more keenly be appreciated. Each of the well-shaped chambers 41, 42 and 43 has positioned therein secondary current transformer windings 61, 23 and 63. These secondary current transformer windings are donut shaped as can be discerned by a study of FIG. 4 which shows a top view of secondary current transformer windings 61. The secondary current transformer windings 61, 23 and 63 are conventional transformer windings in their construction detail and are provided with a pair of leads 64, 65. Leads 64 and 65 are not shown in FIG. 2. The manner in which the secondary current transformer windings 61, 23 and 63 are interconnected is set forth in FIG. 9 to be described hereinafter. FIG. 5 illustrates a cross-section of the current transformer 61 and adds further detail to this conventional secondary current transformer winding. Positioned beneath the current transformer winding 61 and resting on the pheripherally disposed lip 46 is an electromagnetic shield 68. The electromagnetic shield 68, shown in section in FIG. 2, if illustrated in three-dimensional form, would take on the appearance of a washer with a centrally disposed opening 69. Electromagnetic shields 71 and 72 are provided for each of the secondary current transformer windings 23 and 63. Positioned beneath, and arcuately disposed, are armature windings 15, 18 and 19. Electromagnetic fields are generated in armature windings 18 and 19. The affect of these fields is shielded from, for example, secondary current transformer windings 61, 23 by electromagnetic shields 68 and 71 respectively. Each of the current transformers are provided with a neutral lead. Accordingly, there are three neutral leads 20, 24 and 25. Each of the neutral leads is provided with a head 38, 39 and 40. The heads 38, 39 and 40 are integrally electrically secured to a neutral armature strap 76 by means, for example, of solder or brazing. The neutral armature strap 76 is secured to the current transformer support 28 by screws 77, 78, 79 and 80. The screws 77, 78, 79 and 80 are threadingly fitted into threaded openings 51, 52, 53 and 54 of support member 28. Electrically insulating blocks 81, 82, 83 and 84 electrically separate the neutral armature strap 76 from the current transformer support member 28. FIG. 6 illustrates the neutral armature support assembly just described. It will be observed in FIG. 2 that neutral leads 20 and 25 are not positioned coincident with the center line of secondary transformer windings 61 and 63. These neutral conductors 20 and 25 are spaced from the center lines of the windings in order to facilitate the fabrication of the neutral armature assembly to the support member 28. In FIG. 6 at the left hand end of the neutral armature strap 76, there is shown an electrical connection tab 86 not visible in FIG. 2.

Figure 8:
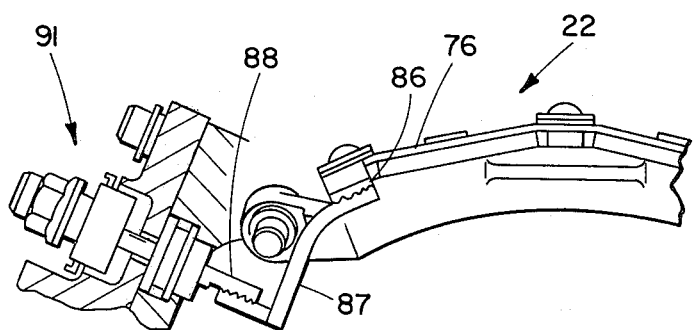
FIG. 8 is a partial section showing the electrical interconnection of the neutral armature assembly to a neutral lead terminal block.

Referring now again to FIG. 2, there is illustrated on the left in this figure a neutral lead terminal block 91. The neutral lead terminal block 91 allows external connection of the neutral leads from the armature to the electrical distribution system. FIG. 8 is a front view of a portion of the current transformer support assembly 22 as set forth in FIG. 1 and depicts the manner in which the electrical connection tab 86 may be secured by wire 87 to a terminal lead 88 of the neutral lead terminal block 91. All of the electrical connections between wires may be provided by conventional soldering or brazing techniques.

Referring now once again to FIG. 2, armature windings 15, 18 and 19 are each provided respectively with neutral armature conductors 49, 48 and 47.

Figure 7:
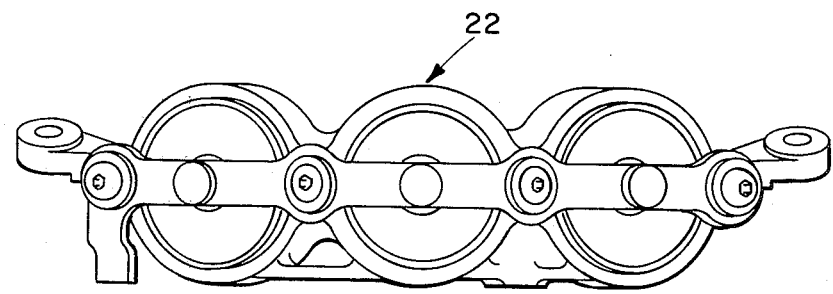
FIG. 7 is a perspective view of a fully assembled current transformer assembly embodying the invention.

Reference is now made to FIG. 7 which illustrates the fully assembled current transformer support assembly 22 with all of the components heretofore described operatively positioned and ready for insertion in the housing of a generator.

Figure 9:
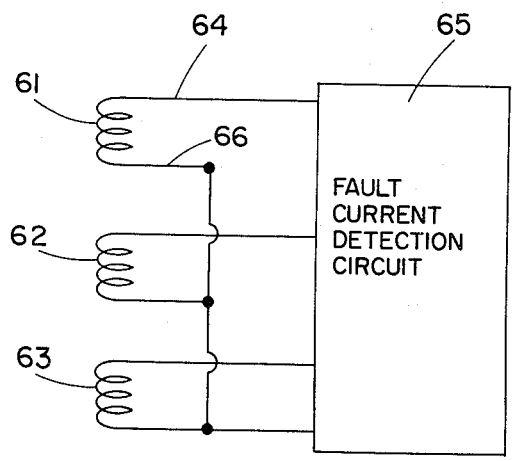
FIG. 9 is a schematic diagram of the manner in which the current transformer secondary windings are interconnected.

FIG. 9 is a schematic diagram in a manner in which the current transformer secondary windings 61, 62 and 63 are connected in parallel to a fault current detection circuit 66.

From the foregoing description, it should be apparent that the current transformer support assembly of this invention provides a compact, rigid structure that enhances the integrity of the manner in which fault current transformers will be secured within a generator.

Although this invention has been illustrated and described in connection with this particular embodiment, it will be apparent to those skilled in the art that various changes may be made therein without departing from the spirit of the invention as set forth in the appended claims.

I claim:

1. A current transformer support assembly in combination with an electromotive machine that includes an armature secured to a housing, the armature having radially disposed neutral armature conductors, said support assembly including:
   an arcuate support member secured internally of said housing, said support member including well shaped means integral with said arcuate shaped support member,
   winding means positioned in said well shaped means,
   a neutral armature means having a strap secured in a mating manner to said support member, and
   said neutral armature means having a neutral lead secured to said strap and passing through a central opening in said winding for electrical connection to said neutral armature conductor.

2. The support assembly of claim 1, wherein said strap has an overall arcuate shape comprised of three straight sections joined by two intermediate sections, said intermediate sections secured to mating insulation means mounted on said support member, said support member and said mating strap matching the internal configuration of said housing.

3. The support assembly of claim 2, wherein said neutral armature arcuate strap extends across said well shaped means and is secured to said support member on opposite sides of said well shaped means, said winding means and said neutral lead forming a current transformer in which said neutral lead acts as a transformer primary, and said winding acts as a transformer secondary.

4. The support assembly of claim 3, wherein said well shaped means includes an electromagnetic shield means disposed between said winding and said armature.

5. The support assembly of claim 1, wherein said neutral armature strap is provided with an electrical connection means to thereby allow for an external electrical connection of said strap through said neutral lead to said neutral armature conductor.

6. The support assembly of claim 5, wherein said winding is provided with a pair of electrical leads.

7. The support assembly of claim 6, where there is provided means to electrically insulate said arcuate strap from said support member.

8. The support assembly of claim 5, wherein said support member is provided with a plurality of well shaped means, and said strap is secured to said support member on opposite sides of each of said well shaped means.

9. The support assembly of claim 8, wherein each of said plurality of well shaped means includes a winding, an electromagnetic shield disposed between said winding and said armature, and a neutral lead mutually electrically secured to said strap and said neutral armature conductors.

10. The support assembly of claim 9, wherein each of said windings is provided with a pair of electrical leads connected in parallel.

* * * * *